US007690793B2

(12) United States Patent
Kodama et al.

(10) Patent No.: US 7,690,793 B2
(45) Date of Patent: Apr. 6, 2010

(54) ILLUMINATION OPTICAL SYSTEM AND PROJECTION-TYPE IMAGE DISPLAY APPARATUS

(75) Inventors: Hiroyuki Kodama, Utsunomiya (JP); Kazuhiro Inoko, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 743 days.

(21) Appl. No.: 11/530,245

(22) Filed: Sep. 8, 2006

(65) Prior Publication Data
US 2007/0058134 A1 Mar. 15, 2007

(30) Foreign Application Priority Data
Sep. 13, 2005 (JP) ............... 2005-265868

(51) Int. Cl.
G03B 21/14 (2006.01)
G03B 21/00 (2006.01)
G03B 21/60 (2006.01)
G02B 5/30 (2006.01)
G02B 27/28 (2006.01)

(52) U.S. Cl. ............... 353/20; 353/32; 353/38; 359/454; 359/487

(58) Field of Classification Search ............... 353/20, 353/30, 33–34, 81, 122, 32, 38; 359/366, 359/487, 495–496, 583, 619, 692, 454–455, 359/621, 623–624, 710; 349/9; 362/19
See application file for complete search history.

(56) References Cited

U.S. PATENT DOCUMENTS

| 5,786,939 | A  | * | 7/1998  | Watanabe     | 359/621    |
|-----------|----|---|---------|--------------|------------|
| 6,257,726 | B1 | * | 7/2001  | Okuyama      | 353/20     |
| 6,396,636 | B2 | * | 5/2002  | Sawaki et al.| 359/624    |
| 6,406,149 | B2 | * | 6/2002  | Okuyama      | 353/38     |
| 6,497,488 | B1 |   | 12/2002 | Yamauchi et al. | 353/38  |
| 6,601,958 | B2 |   | 8/2003  | Ito          | 353/38     |
| 6,783,244 | B1 |   | 8/2004  | Okuyama et al. | 353/57   |
| 7,213,920 | B2 | * | 5/2007  | Matsui et al.| 353/20     |
| 7,575,328 | B2 | * | 8/2009  | Inoko        | 353/38     |
| 2001/0033367 | A1 |   | 10/2001 | Karasawa et al. | 353/30 |
| 2002/0021497 | A1 | * | 2/2002  | McCulloch et al. | 359/619 |
| 2002/0176255 | A1 |   | 11/2002 | Yamauchi et al. | 362/299 |
| 2004/0155019 | A1 | * | 8/2004  | Tanaka       | 219/121.82 |
| 2005/0128921 | A1 |   | 6/2005  | Inoko        | 369/112.09 |
| 2005/0174649 | A1 | * | 8/2005  | Okada et al. | 359/619    |
| 2006/0072074 | A1 | * | 4/2006  | Matsui et al.| 353/20     |
| 2006/0082998 | A1 | * | 4/2006  | Inoko        | 362/268    |
| 2006/0209310 | A1 | * | 9/2006  | Muenz et al. | 356/521    |
| 2008/0002261 | A1 | * | 1/2008  | Hill et al.  | 359/619    |

FOREIGN PATENT DOCUMENTS

| CN | 1316667     | 10/2001 |
|----|-------------|---------|
| EP | 0 961 153   | 1/1999  |
| EP | 1 120 682   | 8/2001  |
| EP | 1 648 177   | 4/2006  |
| JP | 06-075200   | 3/1994  |
| JP | 2001-142141 | 5/2001  |
| JP | 2004-045907 | 2/2004  |

* cited by examiner

*Primary Examiner*—Georgia Y Epps
*Assistant Examiner*—Jori S Byrne-Diakun
(74) *Attorney, Agent, or Firm*—Fitzpatrick, Cella, Harper & Scinto

(57) ABSTRACT

An illumination optical system includes a splitter that includes first and second beam splitters. The second beam splitter includes, on a light source side, a compression optical system for narrowing a width of an incident light and for emitting the incident light having the narrowed width, wherein the compression optical system includes, in order from the light source side to an image display element side, an optical element having a positive refractive power, and an optical element that has a negative refractive power and a concave surface at the image display element side.

7 Claims, 10 Drawing Sheets

FIRST SECTION
(SECTION WITH A WIDE INCIDENT ANGLE DISTRIBUTION ON A PANEL PLANE)

SECOND SECTION
(SECTION WITH A NARROW INCIDENT ANGLE DISTRIBUTION ON THE PANEL PLANE, ORTHOGONAL TO THE FIRST SECTION)

FIRST SECTION
(SECTION WITH A WIDE INCIDENT ANGLE DISTRIBUTION ON A PANEL PLANE)

SECOND SECTION
(SECTION WITH A NARROW INCIDENT ANGLE DISTRIBUTION ON THE PANEL PLANE, ORTHOGONAL TO THE FIRST SECTION)

FIRST SECTION
(SECTION WITH A WIDE INCIDENT ANGLE DISTRIBUTION ON THE PANEL PLANE)

SECOND SECTION
(SECTION WITH A NARROW INCIDENT ANGLE DISTRIBUTION ON THE PANEL PLANE, ORTHOGONAL TO THE FIRST SECTION)

PRIOR ART

ILLUMINATION OPTICAL SYSTEM AND PROJECTION-TYPE IMAGE DISPLAY APPARATUS

BACKGROUND OF THE INVENTION

The present invention relates to an illumination optical system for illuminating a target plane using the light emitted from a light source. The present invention also relates to an image display apparatus, such as a liquid crystal projector, which uses the illumination optical system to illuminate an image display element, such as a liquid crystal panel, and to project the light from the image display element onto the target device to be projected, such as a screen.

Various projectors have recently been proposed, each of which is configured to enlarge and project onto a screen etc. through a projection lens, a light that has been modulated by an image display element, such as a liquid crystal light bulb, in accordance with image data. It is important for the projector that the image projected onto the screen has a uniform brightness over the entire screen.

FIG. 9 is a schematic view of principal part of an illumination optical system Ea in a conventional projector. In FIG. 9, a light emitted from a light source 101 is emitted as a substantially parallel light by a parabolic reflector 102. This parallel light is split and focused by a first fly-eye lens 103 (which is a lens array in which micro spherical lenses are two-dimensionally arranged).

The respective split and focused lights (such as three lights 101a, 101b, and 101c) are focused near a second fly-eye lens 104, and form an image of the light source 101 or a secondary light source image. The micro lenses in the fly-eye lenses 103 and 104 have a rectangular shape that is similar to a shape of a liquid crystal panel 107 provided on a target plane.

Plural split lights 101a, 101b, and 101c emitted from the second fly-eye lens 104 are condensed by the condenser lenses 105, and plural split lights illuminate the liquid crystal panel 107 in superposition via a color separation optical system 106, etc.

FIG. 9 shows only principal elements necessary to explain functions of the illumination optical system Ea for simplified description purposes.

In general, an attempt to improve the light available efficiency is likely to increase an angular distribution of the light incident upon the target plane in the illumination optical system. Thus, various problems occur, when the illumination optical system uses an optical element sensitive to an angular characteristic. For example, the color separation optical system etc. can use a color separation film, such as a dichroic mirror, and a dichroic prism, which inclines to an optical axis in the illumination optical system, and a polarization separation film, such as a polarization beam splitter ("PBS"). In that case, the brightness and colors become uneven, the contrast lower, and the image quality deteriorates on the target plane.

In order to maintain the image quality, an illumination optical system including an asymmetrical optical system that makes an angular distribution narrow in a direction sensitive to the angular distribution of the optical element and wide in a direction insensitive to the angular distribution is known in Japanese Patent Applications, Publication Nos. ("JPs") 06-75200 and 2004-45907.

JP 06-75200 uses an optical integrator for the illumination optical system. The optical integrator uses a one-dimensionally cylindrical array, and uses a Koehler illumination for an illumination in a deflecting direction of an optical element that has a high angular sensitivity, such as a dichroic mirror.

In a section in a direction having a high angular sensitivity of a thin-film element, JP 2004-45907 arranges a stop at a pupil position, and reduces the angular distribution in one sectional direction of the light, improving the contrast of the projected image.

The illumination optical system of JP 06-75200 does not provide a superposed illumination on a Koehler-illuminated section at which the cylindrical lens that does not have a refractive power. Therefore, the light bulb plane (liquid crystal plane's target plane) is likely to cause an uneven light intensity distribution. It is thus necessary to use a relatively flat distribution in an uneven illumination distribution, and thus the light available efficiency is low.

The light from the light source to the condenser lens has a small angular distribution, therefore reducing the image quality deterioration effect on the dichroic mirror between them. However, the condenser lens condenses the light just before the light bulb plane, and thus the image deterioration is inevitable due to an optical element having a high angular sensitivity, such as the light bulb and dichroic mirror, arranged after the condenser lens. Moreover, on a section that does not provide a superposed illumination, due to the fluctuation or deterioration of the light source, such as an arc jump, the light intensity distribution changes on the light bulb and becomes uneven on the projected image, when the light emitting distribution has an uneven brightness.

The image display apparatus of JP 2004-45907 is less subject to the light emitting distribution of the light source, due to the illuminations to the section in superposition in two orthogonal directions. However, the light available efficiency significantly lowers since the stop restricts the light.

A principal point position of part of lenses (an optical system between the lens array and the panel), instead of the stop, differs between two sections to provide different angular distributions on these two sections. However, a method for changing a principal point of a collimeter lens, described in the embodiment, causes a lowered brightness and an uneven light intensity due to the unclear illumination area boundary on the liquid crystal panel plane, or causes uneven contrast or colors, since the telecentric condition destroys (in which the exit pupil is located sufficiently far from panel plane).

BRIEF SUMMARY OF THE INVENTION

The present invention is directed to an illumination optical system that provides a uniform brightness on the image display element, is substantially not affected by the uneven light intensity distribution of the light source, and has a high light available efficiency, while reducing an angular distribution on a section sensitive to the angular distribution of an arbitrary optical element.

An illumination optical system according to one aspect of the present invention includes a splitter for splitting a light from a light source into plural lights; and a superposing unit for superposing split lights on an image display element and illuminating the image display element, wherein the splitter includes a first beam splitter for splitting the light from the light source and for forming plural first light source images in a first light source image area using the split lights on a first section parallel to an optical axis, and a second beam splitter for splitting the light from the light source and for forming plural second light source images in a second light source image area using the split lights on a second section parallel to the optical axis and orthogonal to the first section, the second beam splitter including, on a light source side, a compression optical system for narrowing a width of an incident light and for emitting the incident light having the narrowed width, and wherein the compression optical system includes, in order from the light source side to an image display element side, an optical element having a positive refractive power, and an optical element that has a negative refractive power and a concave surface at the image display element side.

An illumination optical system according to another aspect of the present invention includes a splitter for splitting a light from a light source into plural lights, and a superposing unit for superposing split lights on an image display element and for illuminating the image display element, wherein the splitter includes a first beam splitter for splitting the light from the light source and for forming plural first light source images in a first light source image area using the split lights on a first section parallel to an optical axis, and a second beam splitter for splitting the light from the light source and for forming plural second light source images in a second light source image area using the split lights on a second section parallel to the optical axis and orthogonal to the first section, the second beam splitter including, at a light source side, a compression optical system for narrowing a width of an incident light and for emitting the incident light having the narrowed width, and wherein the compression optical system includes, in order from the light source side to an image display element side, an optical element having a positive refractive power, and an optical element that has a negative refractive power and a lens array having a refractive power on the second section, each lens in the lens array decentering.

An illumination optical system according to still another aspect of the present invention includes a splitter for splitting a light from a light source into plural lights, and a superposing unit for superposing split lights on an image display element and for illuminating the image display element, wherein the splitter includes a first beam splitter for splitting the light from the light source on a first section parallel to an optical axis, and a second beam splitter for splitting the light from the light source on a second section parallel to the optical axis and orthogonal to the first section, the second beam splitter including, at a light source side, a compression optical system for narrowing a width of an incident light and for emitting the incident light, and wherein the compression optical system includes, in order from the light source side to an image display element side, an optical element having a positive refractive power, and an optical element that has a negative refractive power and a concave surface at the image display element side.

A projection-type image display apparatus according to still another aspect of the present invention includes one of the above illumination optical systems, one or more image display elements, and a projection optical system for projecting an image of the image display element.

Other objects and further features of the present invention will become readily apparent from the following description of the preferred embodiments with reference to accompanying drawings.

DETAILED DESCRIPTION OF THE PREFERRED EMBODIMENTS

A description will now be given of embodiments of an illumination optical system and a projection-type image display apparatus according to the present invention.

First Embodiment

Figure 1A:
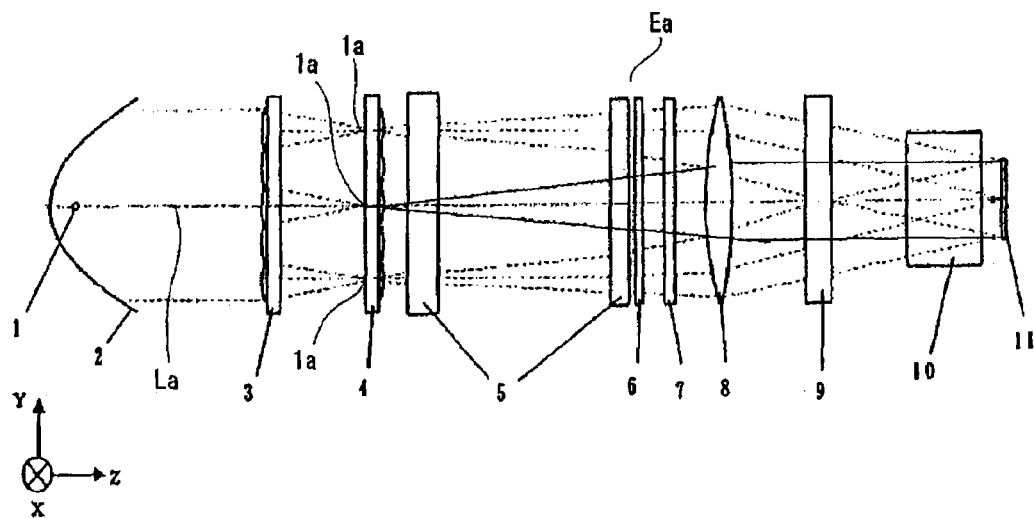
FIG. 1A is a yz cross sectional view of a principal part according to a first embodiment of the present invention.
Figure 1B:
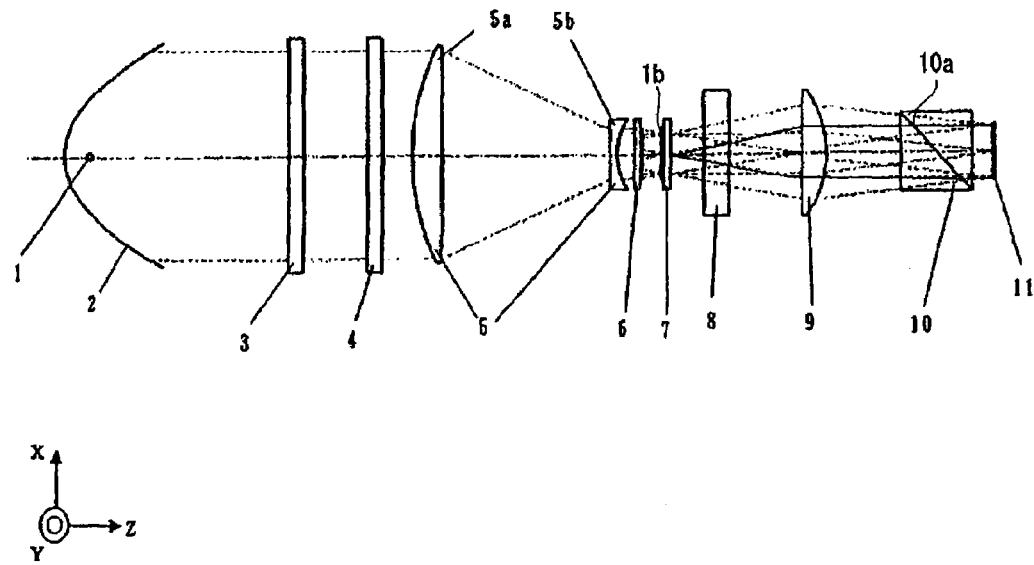
FIG. 1B is an xz cross sectional view of the principal part according to a first embodiment of the present invention.

FIG. 1, comprised of FIGS. 1A and 1B, is a schematic view of a principal part of an illumination optical system Ea according to a first embodiment of the present invention. FIG. 1 shows an embodiment that applies the illumination optical system Ea of the first embodiment to the projector that uses a reflection type or transmission type liquid crystal panel for the image display element.

A Z-axis denotes an optical axis La direction of the illumination optical system Ea.

A Y-axis is provided on a paper plane orthogonal to the Z-axis. An X-axis denotes a direction orthogonal to the Y-axis and the paper plane.

FIG. 1A shows a first section or YZ plane having a wide angular distribution of the incident light upon a liquid crystal panel plane 11.

FIG. 1B shows a second section or XZ plane having a narrow angular distribution of the incident light upon a liquid crystal panel plane 11. These figures show only element fundamental to the optical system used for the projector for simple description purposes.

Of course, there may be provided a polarization converting element array that has an array of polarization conversion elements that convert an unpolarized light into a linearly polarized light, a optical-path deflecting mirror, an infrared cut-off filter, and a polarization plate, etc.

The light emitted in all the directions from a light source (light emitting part in a lamp) 1 is exited as an approximately parallel light by a parabolic reflector 2.

Figure 2:
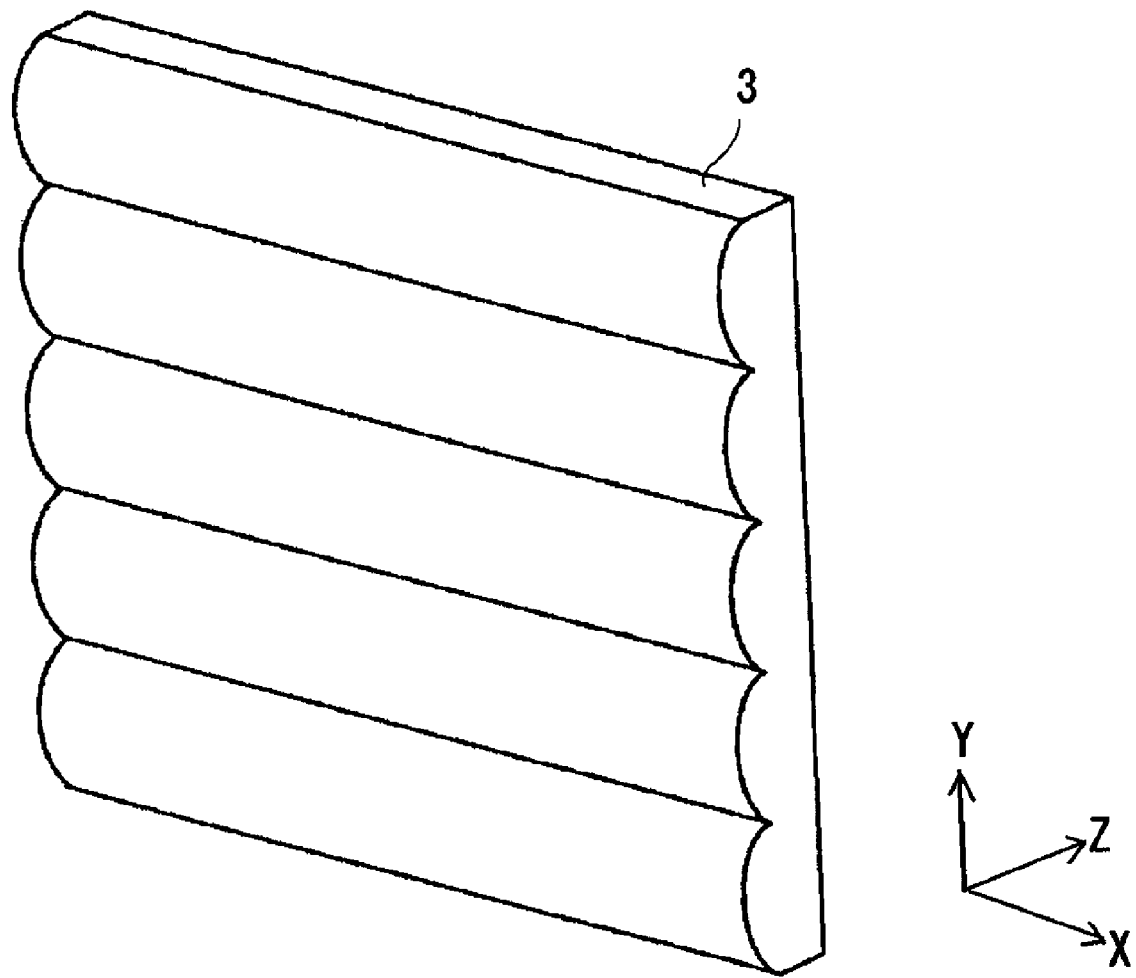
FIG. 2 is a perspective view of a cylindrical lens array for use with the first embodiment of the present invention.

The parallel light is split into plural partial lights by a first cylindrical lens array 3 (optical element array whose perspective view is shown in FIG. 2), and each partial light is focused. Each split light is focused at or near a second cylindrical lens array 4, and each partial light forms a secondary light source image 1a.

Figure 3A:
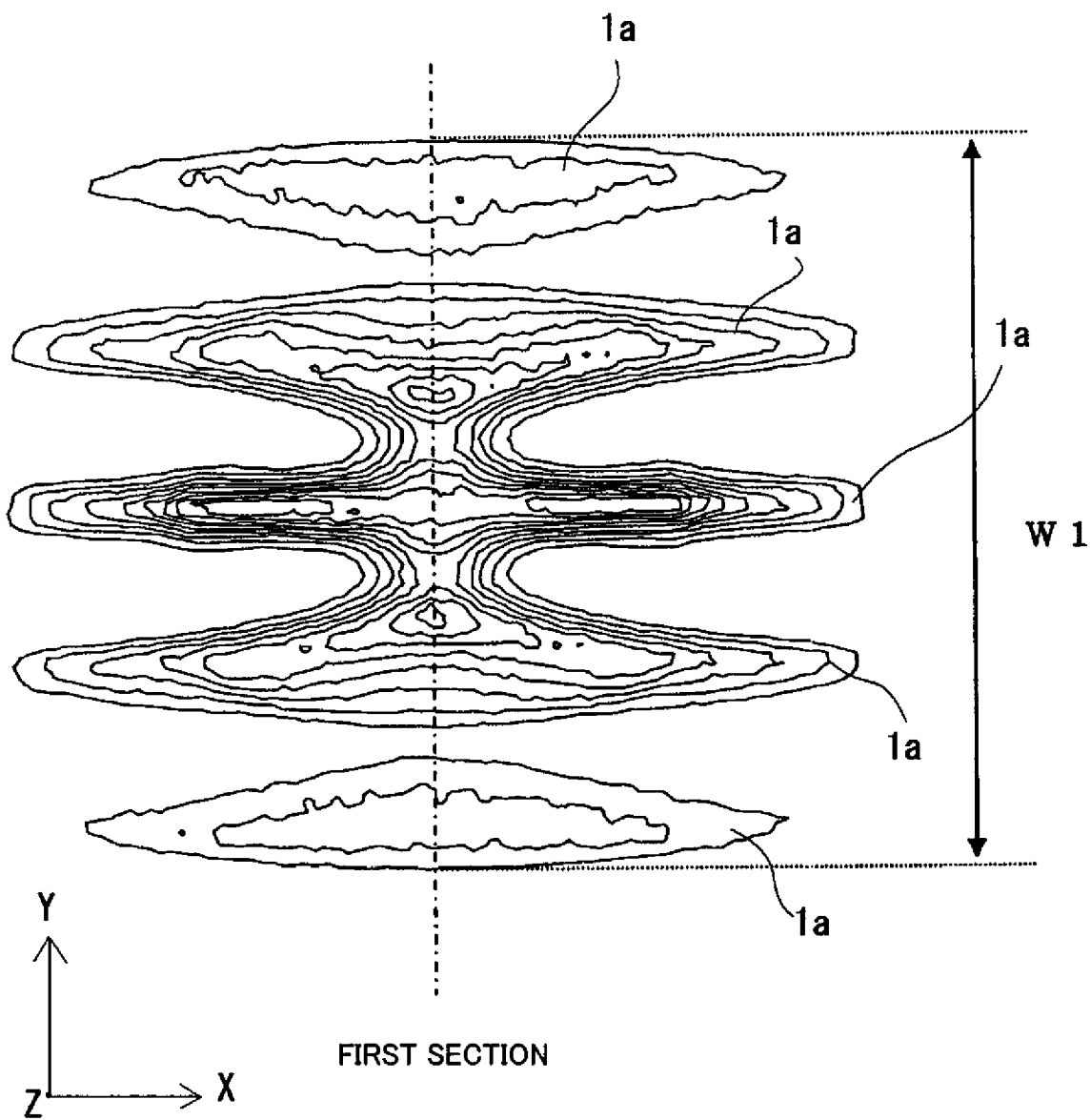
FIG. 3 is an explanatory view showing a light source image forming area according to the first embodiment of the present invention.

FIG. 3A shows the light source image 1a formed by an operation of the first cylindrical lens array 3 in the first embodiment. FIG. 3A shows the light intensity distribution of the light source image on the plane perpendicular to the optical axis La, and illustrates the first section (YZ plane) linearly. An area in which the light source image 1a is formed has a width W1 on the first section (YZ plane).

The light source image 1a is formed at a position of the second cylindrical lens 4 having a refractive power on the first section (YZ plane), preferably an incident position. The width W1 of the forming area of the light source image 1a is the maximum width among the widths of the light source image area obtained when the forming area of the light source image 1a is cut by various sections parallel to the first section (YZ section), or by the first section including the optical axis La.

The cylindrical arrays 3 and 4 have refractive powers only on the first section, and do not substantially affect the light on the second section (XZ plane) perpendicular to the first section.

On the other hand, the afocal optical system 5, the third cylindrical lens array 6, the fourth cylindrical array 7, and cylindrical lens 9 have a refractive power only on the second section (XZ plane). These elements do not have a refractive power on the first section (YZ plane).

The afocal system 5 (light compression system) is an optical system that narrows the diameter of the parallel light and emits it as the parallel light.

Therefore, the light that passes and is split by the second cylindrical lens array 4 is not affected by the above optical element that has a refractive power only on the second section. Each split light is condensed by the condenser lens 8 having a refractive power only on the first section, and illuminates the reflection type liquid crystal panel 11 in superposition through the color separation optical system 10.

Reference numerals 3 to 9 denote elements in the superposing unit.

The color separation optical system 10 includes a polarization beam splitter 10a that is inclined relative to the optical axis La of the illumination optical system Ea so that an angle between the optical axis La of the illumination optical system Ea and the optical axis of the polarization beam splitter ("PBS") 10a is between 42° and 48°, such as 45°.

Of course, the color separation optical system 10 may includes a dichroic mirror or a dichroic prism.

The PBS, as used herein, means an optical element that exhibits a polarization separation characteristic to the light of at least part of the wave range in the visible light region, preferably a wave range having at least 10 nm or greater.

For example, it is an optical element that reflects 80% or greater of the light in one polarization direction in the light incident at a predetermined angle, and transmits 80% or greater of the light in the other perpendicular polarization direction.

The polarization separation characteristic is not necessary provided by the optical element having the polarization separation characteristic to the light in the overall visible light region.

Referring now to FIG. 1B, a description will be given of the behavior or change of the light on the second section (XY plane). On the second section, the light emitted as approximately parallel light from the reflector 2 reaches the afocal optical system 5 having a light compression operation without being affected by the second cylindrical lens arrays 3 and 4.

Figure 3B:
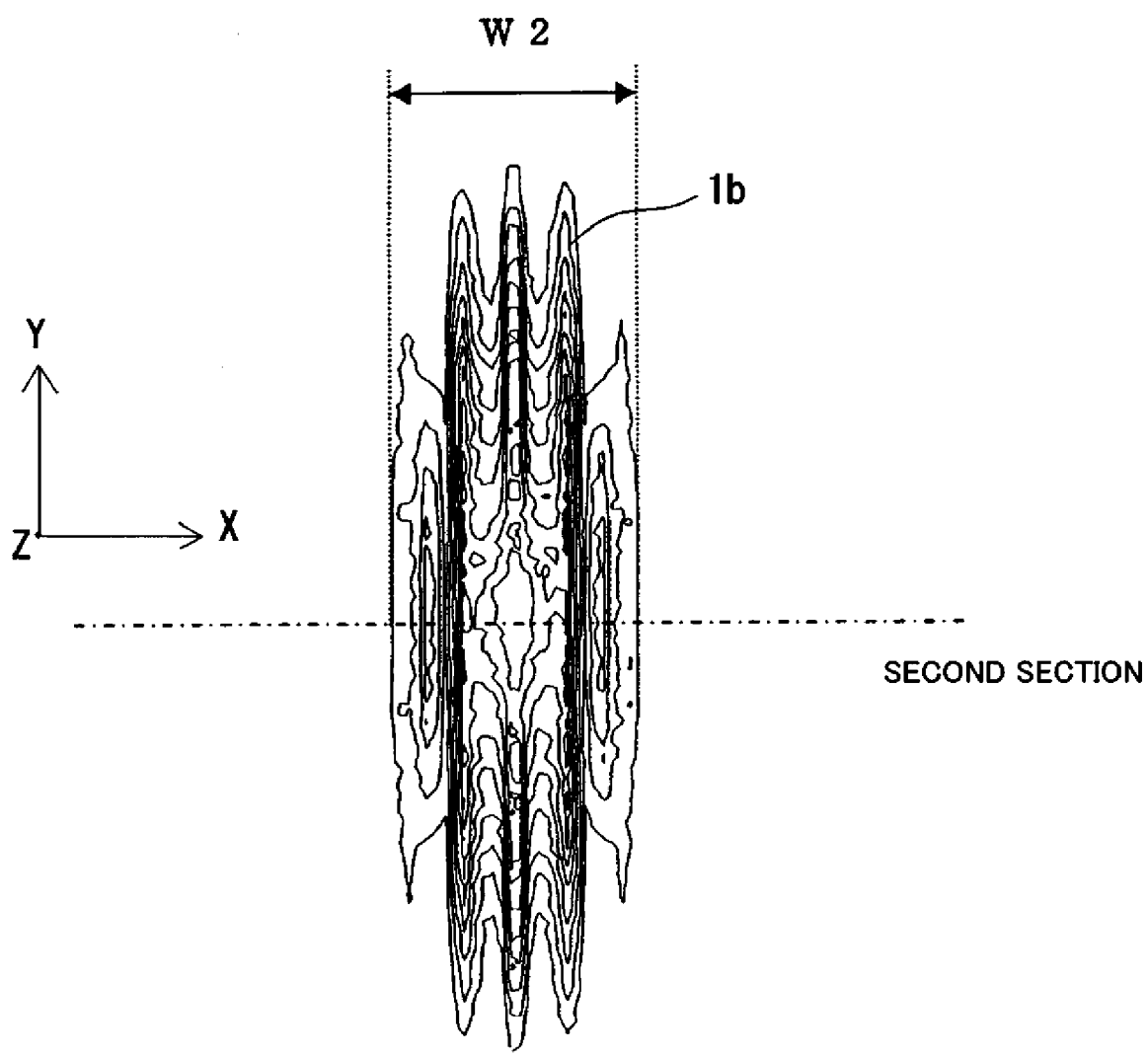

The afocal optical system 5 includes, in order from the light source 1 side, a positive lens 5a and a negative lens 5b, and the negative lens 5b has a concave surface at the liquid crystal panel 11 side. The parallel light compressed by and emitted from the afocal optical system 5 is split by the third cylindrical lens array 6, and each split light is condensed near the fourth cylindrical lens array 7, forming the light source image 1b. FIG. 3B shows the light source image 1b formed by the third cylindrical lens 6 having a refractive power on the second section in the first embodiment. FIG. 3B shows a light source image on a plane perpendicular to an optical axis La of the illumination optical system Ea. One example of the second section can be shown as a straight line in FIG. 3B. W2 denotes a width on this section.

As understood when FIG. 3B is compared with FIG. 3A, the light source image width W2 on the second section is narrower than the light source image width W1 on the first section. A ratio between the width W1 and the width W2 is a ratio of the angular distribution of the PBS 10a in the color separation optical system 10. Preferably, W1>W2, more preferably 0.1<W2/W1<0.8, is met. In this conditional equation, when a value of W2/W1 becomes greater than the upper limit, a sufficient contrast improving effect cannot be obtained.

When the value of W2/W1 becomes smaller than the lower limit, the light split and focused by an arbitrary lens cell in the third cylindrical lens array 6 is not incident upon a corresponding lens cell in the fourth cylindrical lens array 7, and the ratio of the lights incident upon an undesired lens cells increases. Part of the light that does not incident upon the corresponding lens cell reaches a position apart from the effective area on the target plane 11 and does not become an effective light, lowering the light available efficiency.

When the value W2/W1 becomes smaller than the lower limit, the ratio of the light that does not reach the target plane 11 remarkably increases, and the brightness of the projector significantly decreases.

The width W1 corresponds to the light diameter on the first section of the incident light upon the second cylindrical lens 4, and the width W2 corresponds to the light diameter on the second section of the incident light upon the fourth cylindrical lens 7.

The light split by and exited from the fourth cylindrical lens array 7 is condensed by the cylindrical lens 9, and illuminates the reflection type liquid crystal panel 11 in superposition through the color separation optical system 10 having the PBS 10a, etc.

The condenser lens 8 does not have a refractive power on the second section in the first embodiment, and does not substantially affect the light. Alternatively, the condenser lens 8 may be a spherical lens, or the condenser lens 8 and the cylindrical lens 9 may condense the split light.

The condenser lens 8 may be a condenser system that includes plural elements including a negative lens.

Figure 4:
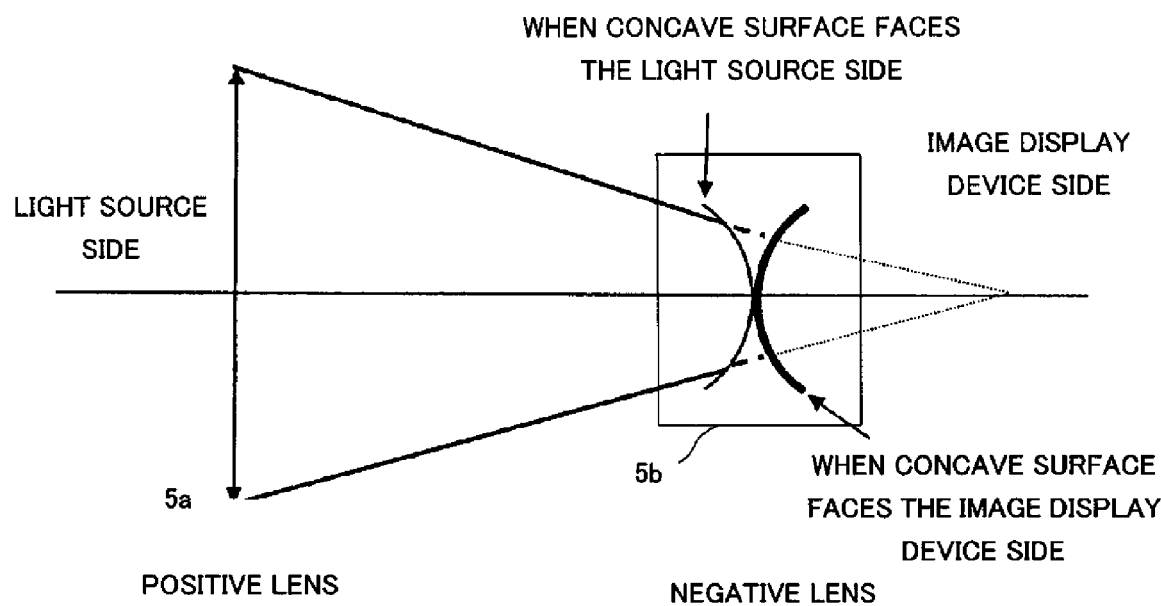
FIG. 4 is a schematic view of an afocal optical system (compression optical system) according to the first embodiment of the present invention.

The negative lens 5b has a convex surface at the image display element 11 side in the first embodiment. Referring now to FIG. 4, a description will be given of the technical characteristic of the concave shape.

The light compression system 5 is an afocal system that includes positive and negative lenses on the second section. When the concave surface of the negative lens 5b in the afocal system faces the light source, the compression of the peripheral part is smaller and the angle of the light incident upon the panel becomes larger than a case where the concave surface faces the concave surface of the image display element 11. This causes a problem, such as a lowered image contrast.

When the concave surface position moves to the image display element 11 side in order to make the compression ratio similar, the parallelism deteriorates. This configuration increases a ratio of the light, which is split and focused by an arbitrary lens cell in the third cylindrical lens array 6, and is incident upon a lens cell different from a corresponding lens cell in the fourth cylindrical lens array 7.

Part of the light that does not enter the corresponding cell reaches a position apart from the effective area on the target plane 11, and does not become the effective light, lowering the light available efficiency.

While the negative lens 5b has a plane surface at the light source 1 side, the negative lens 5b may have a convex or concave surface. When it has a concave shape, both lens surface are concave. A similar effect is available when the surface at the image display element 11 side has a stronger refractive power than that at the light source side.

An effect is available to some extent even when the surface at the image display element 11 side has a weaker refractive power than that at the light source side.

The first embodiment makes smaller the angular distribution of the illumination light incident upon the reflection type liquid crystal panel (or target plane) 11 on the second section (after the light passes the final optical element that has a power in the illumination optical system Ea) than that on the first section.

The PBS 10a in the color separation optical system 10 arranged before the reflection type liquid crystal panel 11 (at the light incident side) deflects the optical path of part of the light on the second section.

The PBS that utilizes a general dielectric multilayer coating splits polarized lights using a reflectance difference between the p-polarized light and the s-polarized light at the Brewster angle, and an effect of splitting the polarized light reduce as a difference from the Brewster angle increases.

Therefore, when the illumination optical system having a wide angular distribution is used, the polarized light to be transmitted is reflected or the polarized light to be reflected is transmitted.

Hence, the (leakage) light having a polarization state different from the desired polarized light enters the liquid crystal panel, etc., and lowers the image contrast.

In the illumination optical system of the first embodiment, the angular distribution on the second section sensitive to the angular distribution is made smaller than that on the first section insensitive to the angular distribution. This configuration restrains the amount of the leakage light on the second section sensitive to the angular distribution, and provides a high contrast and high light available efficiency.

The first embodiment does not compress the diameter on the first section of the light emitted from the reflector, and compresses the diameter on the second section of the light emitted from the reflector. This configuration makes the width W1 of the light source image forming area on the first section different from the width W2 of the light source image forming area on the second section, but the present invention is not limited to this configuration.

For example, the light diameter may be compressed on both the first and second sections.

Alternatively, one of the diameters is compressed and the other diameter may be enlarged, or both diameters may be enlarged.

The elliptical reflector 2 may be used to compress the diameter of the light. The first and second sections may have different widths of the light source forming areas. Any other structures may be used as long as the width W2 of the light source image forming area on the section sensitive to the angular distribution is smaller than the width W1 of the light source image forming area on the section insensitive to the angular distribution.

The sensitive section, as used herein, means a section parallel to both the normal to the polarization separation plane in the PBS 10a arranged in the illumination optical system Ea and the optical axis La in the illumination optical system Ea, or the second section in this embodiment.

The insensitive section is the first section perpendicular to the second section.

The polarization converting element or PBS array can be arranged near the lens array in the projector.

When polarization converting element is placed after the fourth cylindrical lens, the optical element can be made smaller than ever and the apparatus can be advantageously made smaller and simpler.

Second Embodiment

Figure 5A:
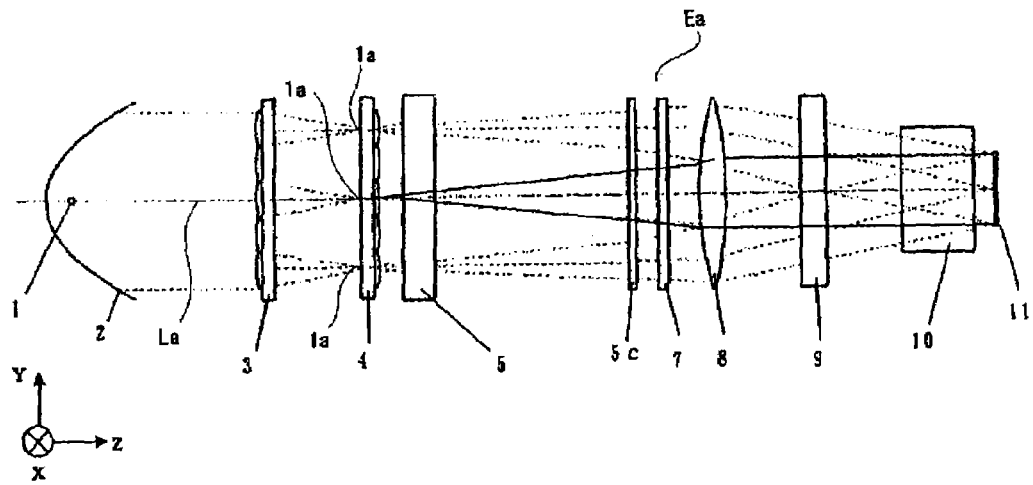
FIG. 5A is a yz cross sectional view of a principal part according to a second embodiment of the present invention.
Figure 5B:
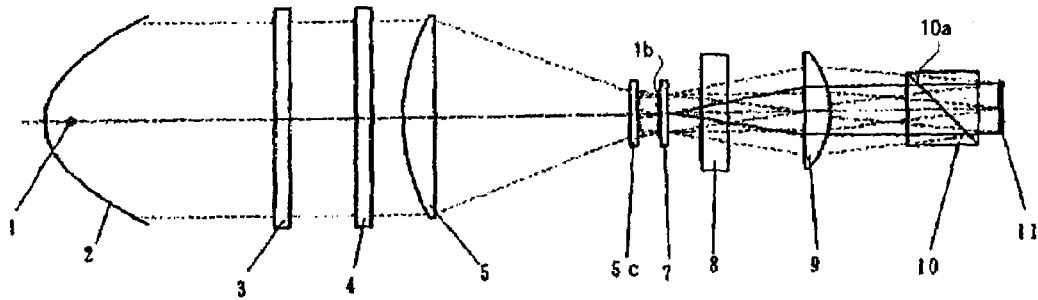
FIG. 5B is an xz cross sectional view of the principal part according to a second embodiment of the present invention.

FIG. 5, comprised of FIGS. 5A and 5B, is a schematic view of a principal part of the illumination optical system Ea according to a second embodiment of the present invention.

Figure 6:
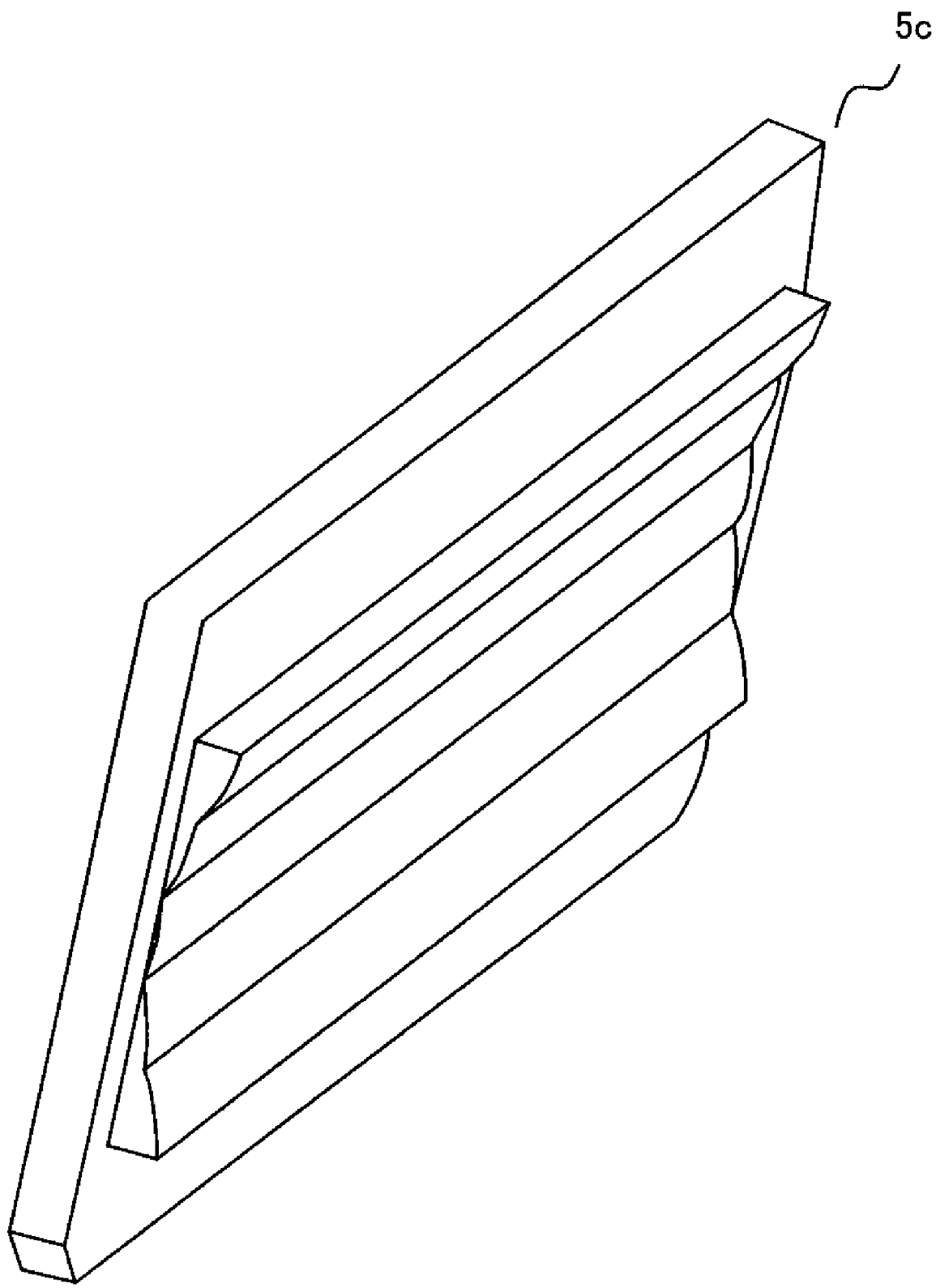
FIG. 6 is a perspective view of a cylindrical array 5c for use with the second embodiment of the present invention.

The second embodiment is different from the first embodiment in that the second embodiment integrates the negative lens 5b in the compression optical system 5 and the third cylindrical lens array 6 into one component, which corresponds to the fifth cylindrical lens array 5c. FIG. 6 is a perspective view of the fifth cylindrical lens array 5c.

Figure 7:
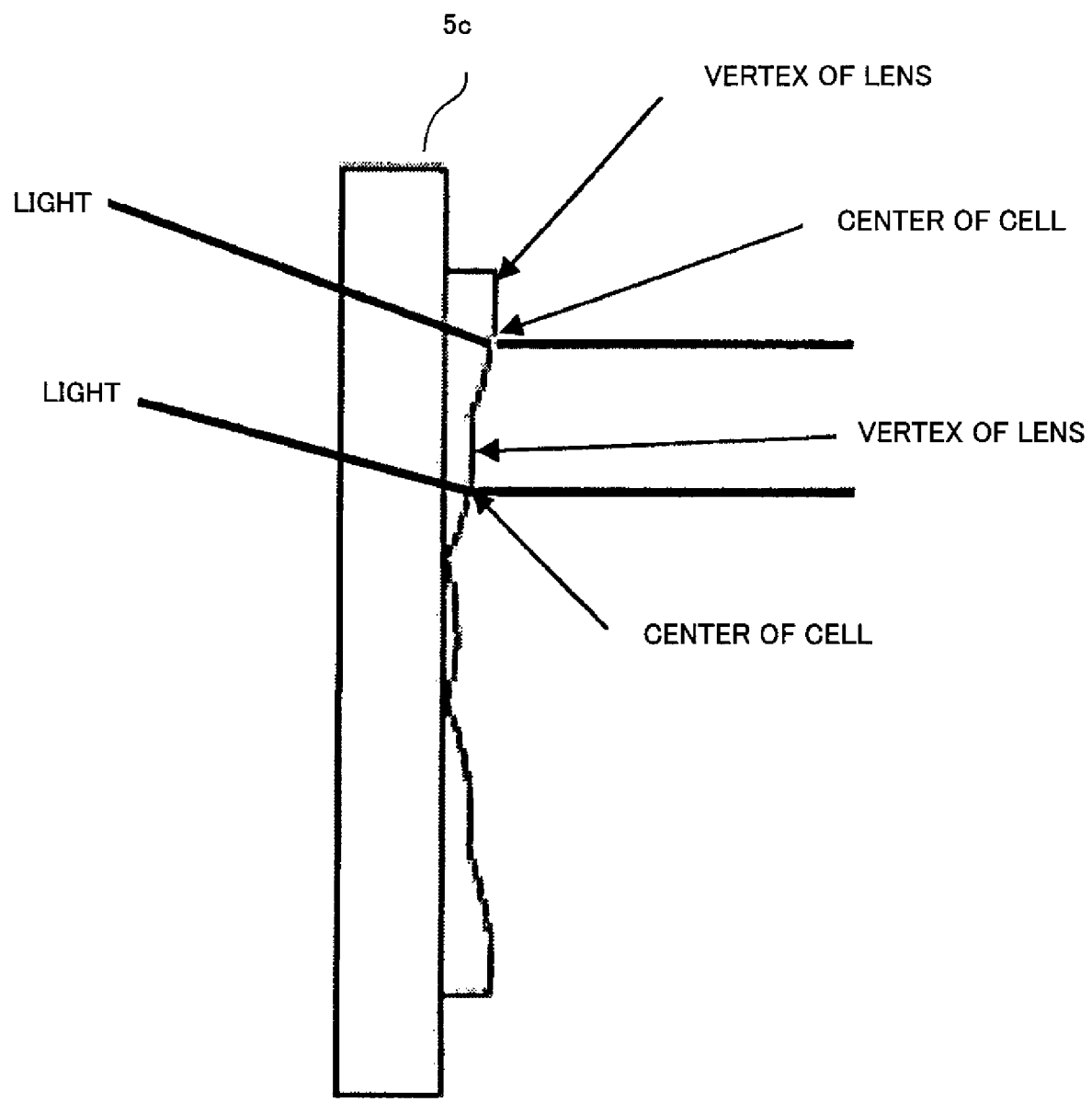
FIG. 7 is an enlarged view of a cylindrical array 5c for use with the second embodiment of the present invention.

FIG. 7 is an enlarged view. The fifth cylindrical lens 5c is shaped so that the lens array is formed on the concave surface. As shown in FIGS. 5A and 5B, the fifth cylindrical lens 5c has such an optical operation that fifth cylindrical lens 5c serves as both the negative lens 5b in the compression optical system 5 with the third cylindrical lens 6 in the first embodiment.

The fifth cylindrical lens 5c serves as a negative lens by decentering the center of each lens (or center of the cell) in the lens array from the lens's vertex. In this case, since the lens array surface serves as the negative lens of the compression optical system 5, the lens array surface faces the image display element 11 side. Other optical elements are the same as those in the first embodiment. Since one element's one surface serve as the negative lens and light separation, this configuration decreases the number of components, simplifies the structure of the illumination optical system, and improves the yield.

Third Embodiment

Figure 8:
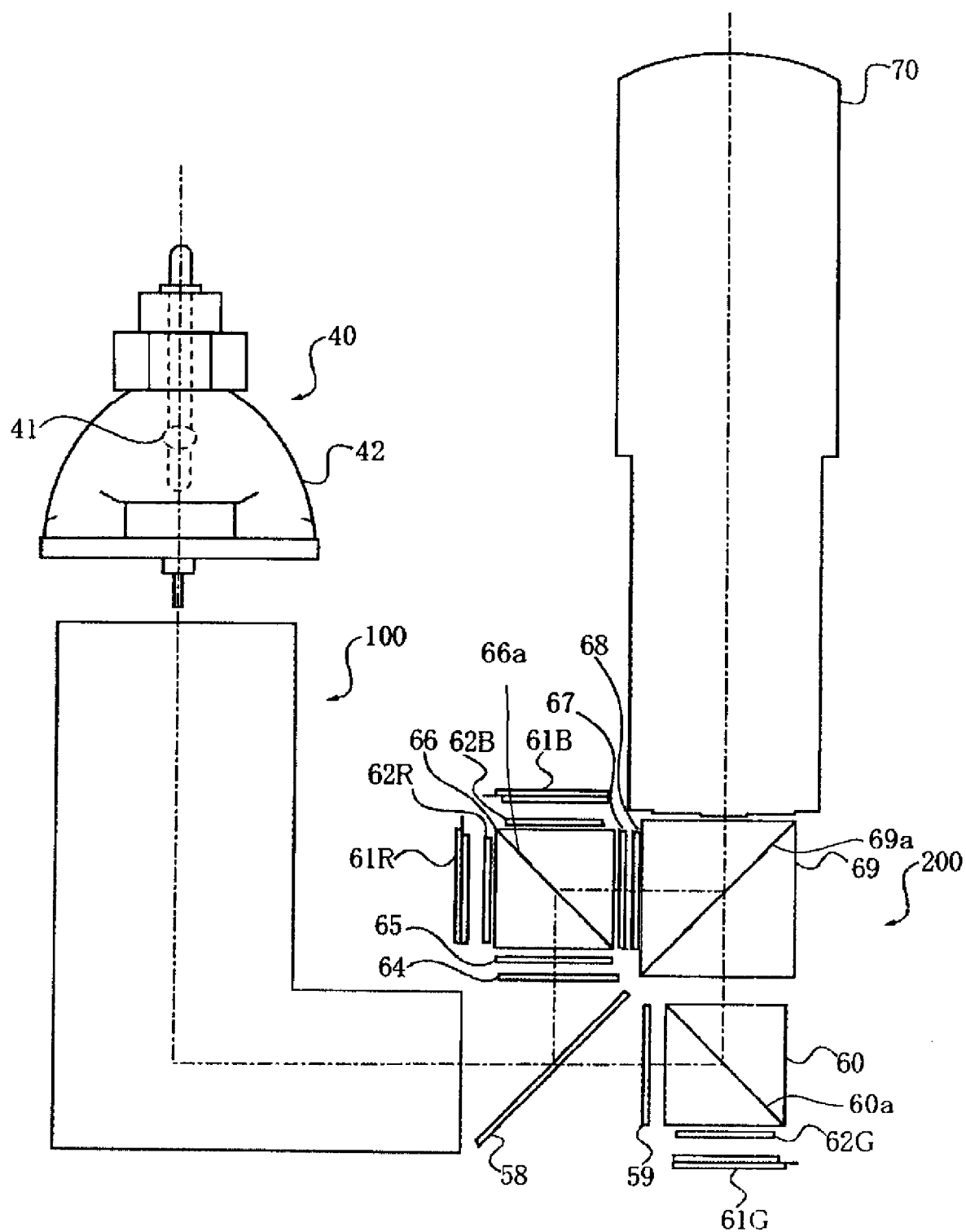
FIG. 8 is a schematic view of principal part according to a third embodiment of the present invention.
Figure 9:
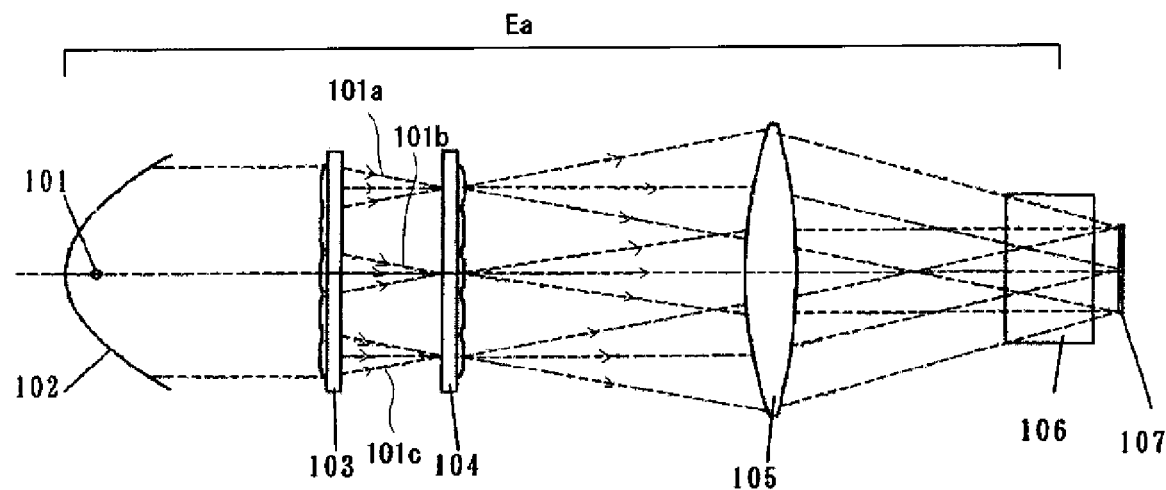
FIG. 9 is a schematic view showing a structure of a conventional projector.

FIG. 8 is a schematic view of principal part of an image display apparatus or projector according to the third embodiment that utilizes the inventive illumination optical system.

In FIG. 8, 41 denotes a light emitting bulb that emits a white light in a continuous spectrum. 42 denotes a reflector that condenses the light from the light emitting bulb 41 in a predetermined direction. The light emitting bulb 41 and the reflector 42 form a lamp (light source) 40. The light from this lamp 40 is introduced to the liquid display elements (or reflection type liquid crystal panels) 61R, 61G, and 61B using the illumination optical system 100 described in the first and second embodiments.

In FIG. 8, 58 denotes a dichroic mirror that reflects the wave range of the blue (B) and red (R) and transmits the light in the green (G) wave range. 59 denotes an incident-side polarization plate for the G light which adheres the polarization element on a transparent substrate, and transmits only the s-polarized light. 60 denotes a first PBS that transmits the p-polarized light and reflects the s-polarized light, and has a polarization separation surface 60a.

61R, 61G, and 61B respectively denote an R reflection type liquid crystal display ("LCD") device, a G reflection type LCD device, and a B reflection type LCD device, each of which reflects the incident light and modulates an image. 62R, 62G, and 62B respectively denote an R ¼ wave plate, a G ¼ wave plate, and a B ¼ wave plate. 64 denotes an R and B incident-side polarization plate in which a polarization element is adhered to a transparent substrate. 65 denotes a first color selective phase difference plate that converts the polarization direction of the B light by 90°, and maintains the polarization direction of the R light. 66 denotes a second PBS that transmits the p-polarized light and reflects the s-polarized light, and has a polarization separation surface 66a. 67 denotes a second color selective phase difference plate that converts the polarization direction of the R light by 90°, and maintains the polarization direction of the B light.

68 denotes a R and B exit-side polarization plate (polarization element), and transmits only the s-polarized light. 69 denotes a third PBS or color synthesizing device which transmits the p-polarized light and reflects the s-polarized light, and has a polarization separation surface 69a.

The elements including the dichroic mirror 58 to the third PBS 69 constitute a color separation and synthesis optical system 200.

70 is a projection lens. An image display optical system includes the illumination optical system 100, the color separation and synthesis optical system 200, and the projection lens 70.

The G light that has passed the dichroic mirror 58 enters the incident-side polarization plate 59. The G light remains to be the s-polarized light after split by the dichroic mirror 58. The G light is incident as the s-polarized light upon the first PBS 60, is reflected on the polarization separation plane 60a, and reaches the G reflection type LCD device 61G, after exited from the incident-side polarization plate 59. The G reflection type LCD device 61G modulates and reflects an image of the G light. In the image-modulated G reflected light, the s-polarized light component is reflected on the polarization separation plane 60a, returns to the light source 40, and is removed from the projected light.

On the other hand, the p-polarized light component in the image-modulated G reflected light transmits the polarization separation plane 60a in the first PBS 60, and directs as a projected light to the third PBS 69.

While all the polarized light components are converted into the s-polarized lights or black is displayed, a slow axis of the ¼ wave plate 62G between the first PBS 60 and the G reflection type LCD device 61G is adjusted to a predetermined direction. This configuration can reduce the influence of the disturbance of the first PBS 60 and the polarization state generated in the G reflection type LCD device 61G.

The G light emitted from the first PBS 60 is incident as a p-polarized light to the third PBS 69, transmits the polarization separation plane 69a of the third PBS 69, and reaches the projection lens 70.

On the other hand, the R and B lights reflected on the dichroic mirror 58 enter the incident-side polarization plate 64. The R and B lights remain to be the s-polarized light after split by the dichroic mirror 58. The R and B lights enter the first color selective phase difference plate 65 after exited from the incident-side polarization plate 64. The first color selective phase difference plate 65 serves to rotate the polarization direction of the B light by 90°, and thereby the B light is incident as a p-polarized light and the R light is incident as an s-polarized light upon the second PBS 66.

The R light incident as an s-polarized light upon the second PBS 66 is reflected on the polarization separation plane 66a in the second PBS 66, and reaches the R reflection type LCD device 61R.

The B light incident as a p-polarized light upon the second PBS 66 transmits the polarization separation plane 66a of the second PBS 66, and reaches the B reflection type liquid LCD device 61B.

The R light incident upon the R reflection type LCD device 61R is image-modulated and reflected. The s-polarized light component in the image-modulated R reflected light is again reflected on the polarization separation plane in the second PBS 66, retuned to the light source 40 side, and removed from the projected light.

On the other hand, the p-polarized light component in the image-modulated R reflected light transmits as a projected light the polarization separation plane 66a in the second PBS 66, and reaches the second color selective phase plate 66.

The B light incident upon the B reflection type LCD device 61B is image-modulated and reflected. The p-polarized light component in the image-modulated B reflected light again transmits the polarization separation plane 66a in the second PBS 66 to the light source 40 side, and is removed from the projected light.

At this time, the slow axes of the ¼ wave plates 62R and 62B arranged between the second PBS 66 and the R reflection type LCD device 61R and between the R and B reflection type LCD device 61B are adjusted. Thereby, the black display for the R and B lights is adjusted similar to the G light.

Among the composite projected R and B light emitted from the second PBS 66, the polarization direction of the R light is rotated by 90° by the second color selective phase plate 67, and turned into the s-polarized light component. The R light is detected by the exit-side polarization plate 68, and incident upon the third PBS 69.

The B light transmits as an s-polarized light to the second color selective phase plate 67, is detected by the exit-side polarization plate 68, and is incident upon the third PBS 69.

The R and B projected light is detected by the exit-side polarization plate 68, and turned into a light in which an unnecessary component is removed which occurs when the R and B light transmits the second PBS 66, the R and B reflection type LCD devices 61R and 61B, and the ¼ wave plates 62R and 62B.

The R and B projected light incident upon the third PBS 69 is reflected on the polarization separation plane 69a in the third PBS 69, is synthesized with the G light that transmits the polarization separation plane 69a, and reaches the projection lens 70.

The composite R, G, and B projected light is enlarged and projected onto a screen or target plane through the projection lens 70.

The above description relates to the optical path when the reflection type LCD device displays white, and a description will be given of an optical path when the reflection type LCD device displays black.

A description of the G optical path will now be given.

The s-polarized light of the G light that transmits the dichroic mirror 58 is incident upon the incident-side polarization plate 59, is then reflected on the polarization separation plane 60a in the first PBS 60, and reaches the G-use reflection type LCD device 61G.

Since the reflection type LCD device 61G displays black, the G light is reflected without being image-modulated. Therefore, the G light remains to be an s-polarized light even after reflected by the reflection type LCD device 61G, and is again reflected on the polarization separation plane 60a in the first PBS 60. The G light is returned to the light source 40 side through the incident-side polarization plate 59, and is removed from the projected light.

A description will now be given of the optical paths of the R and B lights.

The s-polarized lights of the R and B lights reflected on the dichroic mirror 58 are incident upon the incident-side polarization plate 64. The R and B lights enter the first color selective phase difference plate 65 after emitted from the incident-side polarization plate 64.

The first color selective phase difference plate 65 serves to rotate only the polarization direction of the B light by 90°, thereby the B light is incident as a p-polarized light and the R light is incident as an s-polarized light upon the second PBS 66.

The R light incident as an s-polarized light upon the second PBS 66 is reflected on the polarization separation plane 66a in the second PBS 66, and reaches the R reflection type LCD device 61R.

The B light incident as a p-polarized light upon the second PBS 66 transmits the polarization separation plane 66a in the second PBS 66, and reaches the B reflection type LCD device 61B.

The R reflection type LCD device 61R displays black, and the R light incident upon the R reflection type LCD device 61R is reflected without being image-modulated.

Thus, even after the R light is reflected on the R reflection type LCD device 61R, the R light remains to be the s-polarized light, is again reflected on the polarization separation plane 60a in the first PBS 60, is returned to the light, and is removed from the projected light, displaying black.

On the other hand, the B light incident upon the B reflection type LCD device 61B is reflected without being image-modulated, because the B reflection type LCD device 61B displays black.

Thus, even after the B light is reflected on the B reflection type LCD device 61B, the B light remains to be the p-polarized light. Therefore, the B light again transmits the polarization separation plane 60a in the first PBS 60, and is turned into the s-polarized light by the first color selective phase difference plate 65, transmits the incident-side polarization plate 64. The B light is then returned to the light source 40 side, and is removed from the projected light.

The projection type image display apparatus has such an optical structure using the reflection type LCD device or reflection type liquid crystal panel.

The third embodiment uses the wavelength selective phase difference plate etc. for the color separation and synthesis system 200.

However, the PBS arranged in the color separation and synthesis system 200 may use a PBS that works to a specific wave range in the visible range. In that case, the wavelength selective phase difference plate becomes unnecessary as long as it includes a polarization separation film exhibiting a transmission or reflection characteristic to another wave range irrespective of its polarization direction.

A ¼ phase difference plate may be arranged between the color separation and synthesis system 200 and the projection lens 70 so that the light that is reflected by the lens surface in the projection lens 70 and returned is prevented from again being reflected and returned to the screen direction (target plane direction).

Although the third embodiment uses three LCD devices, the number of LCD devices is not limited to three but may be two or four or one.

This embodiment can provide an illumination optical system that approximately uniformly illuminates the target plane, and provides an illumination optical system having a light available efficiency, and a projection-type image display apparatus using the illumination optical system.

This application claims a foreign priority benefit based on Japanese Patent Application No. 2005-265868, filed on Sep. 13, 2005, which is hereby incorporated by reference herein in its entirety as if fully set forth herein.

What is claimed is:

1. An illumination optical system illuminating an illuminated plane with a luminous flux from a light source, comprising:
   a first beam splitter splitting the luminous flux from the light source and forming plural first light source images in a first light source image area using split luminous fluxes on a first section parallel to an optical axis of the illumination optical system;
   a second beam splitter splitting the luminous flux from the light source and forming plural second light source images in a second light source image area using split luminous fluxes on a second section parallel to the optical axis and orthogonal to the first section;
   a compression optical system disposed closer to the light source than the second beam splitter and compressing an incident luminous flux on the second section;
   a superposing system disposed closer to an illuminated plane than the first beam splitter and the second beam splitter and superposing the luminous fluxes from the first light source image and the second light source image on the illuminated plane; and
   an optical element disposed between the superposing system and the illuminated plane and having a polarization splitting surface,
   wherein a normal of the polarization splitting surface is parallel to the second section,
   a width of the first light source image area in a direction perpendicular to the optical axis of the first section is greater than a width of the second light source image area in a direction perpendicular to the optical axis on the second section,
   the compression optical system includes, in order from a light source side to an illuminated plane side, a first compression optical element having a positive refractive power and a second compression optical system having a negative refractive power, and
   an illuminated plane side surface of the second compression optical system having the negative refractive power is a concave surface.

2. An illumination optical system according to claim 1, wherein a width of the luminous flux incident upon the second beam splitter on the second section is smaller than a width of the first beam splitter on the first section.

3. An illumination optical system according to claim 1, wherein $0.1<W2/W1<0.8$ is met, where $W1$ is the width of the luminous flux incident upon the first beam splitter on the first section, and $W2$ is the width of the luminous flux incident upon the second beam splitter on the second section.

4. An illumination optical system according to claim 1, wherein the second compression optical system comprises a lens array having a refractive power on the second section, plural lens cells in the lens array including a lens cell whose optical axis is decentered with respect to a center of the lens cell, and
   a surface of the lens array on which the plural lens cells are formed is located at the illuminated plane side.

5. A projection image display apparatus comprising:
   a first beam splitter splitting a luminous flux from a light source and forming plural first light source images in a first light source image area using split luminous fluxes on a first section parallel to an optical axis of an illumination optical system;
   a second beam splitter splitting the luminous flux from the light source and forming plural second light source images in a second light source image area using split luminous fluxes on a second section parallel to the optical axis and orthogonal to the first section;

a compression optical system disposed closer to the light source than the second beam splitter and compressing an incident luminous flux on the second section;

a superposing system disposed closer to an illuminated plane than the first beam splitter and the second beam splitter and superposing the luminous fluxes from the first light source image and the second light source image on the illuminated plane; and an optical element disposed between the superposing system and the illuminated plane and having a polarization splitting surface, wherein a normal of the polarization splitting surface is parallel to the second section, a width of the first light source image area in a direction perpendicular to the optical axis on the first section is greater than a width of the second light source image area in a direction perpendicular to the optical axis on the second section, the compression optical system includes, in order from a light source side to an illuminated plane side, a first compression optical element having a positive refractive power and a second compression optical system having a negative refractive power, an illuminated plane side surface of the second compression optical system having the negative refractive power is a concave surface, one or more image display elements; and a projection optical system for projecting an image of an image display element.

6. A projection image display apparatus comprising:

a first beam splitter splitting a luminous flux from a light source and forming plural first light source images in a first light source image area using split luminous fluxes on a first section parallel to an optical axis of an illumination optical system;

a second beam splitter splitting the luminous flux from the light source and forming plural second light source images in a second light source image area using split luminous fluxes on a second section parallel to the optical axis and orthogonal to the first section;

a compression optical system disposed closer to the light source than the second beam splitter and compressing an incident luminous flux on the second section; and a superposing system disposed closer to an illuminated plane than the first beam splitter and the second beam splitter and superposing the luminous fluxes from the first light source image and the second light source image on the illuminated plane, wherein a width of the first light source image area in a direction perpendicular to the optical axis on the first section is greater than a width of the second light source image area in a direction perpendicular to the optical axis on the second section, the compression optical system includes, in order from a light source side to an illuminated plane side, a first compression optical element having a positive refractive power and a second compression optical system having a negative refractive power, an illuminated plane side surface of the second compression optical system having the negative refractive power is a concave surface, one or more image display elements; and a projection optical system for projecting an image of an image display element.

7. An illumination optical system illuminating an illuminated plane with a luminous flux from a light source, comprising:

a first beam splitter splitting the luminous flux from the light source and forming plural first light source images in a first light source image area using split luminous fluxes on a first section parallel to an optical axis of the illumination optical system;

a second beam splitter splitting the luminous flux from the light source and forming plural second light source images in a second light source image area using split luminous fluxes on a second section parallel to the optical axis and orthogonal to the first section;

a compression optical system disposed closer to the light source than the second beam splitter and compressing an incident luminous flux on the second section; and a superposing system disposed closer to an illuminated plane than the first beam splitter and the second beam splitter and superposing the luminous fluxes from the first light source image and the second light source image on the illuminated plane, wherein a width of the first light source image area in a direction perpendicular to the optical axis on the first section is greater than a width of the second light source image area in a direction perpendicular to the optical axis on the second section, the compression optical system includes, in order from a light source side to an illuminated plane side, a first compression optical element having a positive refractive power and a second compression optical system having a negative refractive power, and an illuminated plane side surface of the second compression optical system having the negative refractive power is a concave surface.

* * * * *